United States Patent
Mathew et al.

(10) Patent No.: US 11,847,576 B2
(45) Date of Patent: *Dec. 19, 2023

(54) METHODS AND SYSTEM FOR MANAGING PREDICTIVE MODELS

(71) Applicant: Apple Inc., Cupertino, CA (US)

(72) Inventors: Binu K. Mathew, Los Gatos, CA (US); Kit-Man Wan, Cupertino, CA (US); Gaurav Kapoor, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1059 days.

This patent is subject to a terminal disclaimer.

(21) Appl. No.: 16/538,706

(22) Filed: Aug. 12, 2019

(65) Prior Publication Data
US 2020/0034725 A1 Jan. 30, 2020

Related U.S. Application Data

(63) Continuation of application No. 14/500,985, filed on Sep. 29, 2014, now Pat. No. 10,380,488.
(Continued)

(51) Int. Cl.
*G06N 5/04* (2023.01)
*G06N 20/00* (2019.01)
(Continued)

(52) U.S. Cl.
CPC .............. *G06N 5/04* (2013.01); *G06N 5/043* (2013.01); *G06N 20/00* (2019.01); *H04L 67/10* (2013.01)

(58) Field of Classification Search
CPC ........ G06N 5/04; G06N 5/043; G06N 99/005; H04L 67/10
See application file for complete search history.

(56) References Cited

U.S. PATENT DOCUMENTS 6,336,138 B1 * 1/2002 Caswell ................ H04L 43/091
709/224
7,725,300 B2 5/2010 Pinto et al.
(Continued)

OTHER PUBLICATIONS

Kridel, Don, and Daniel Dolk. "Automated self-service modeling: predictive analytics as a service." Information Systems and e-Business Management 11.1 (2013): 119-140. (Year: 2013).*
(Continued)

*Primary Examiner* — Daniel T Pellett
(74) *Attorney, Agent, or Firm* — BAKERHOSTETLER (57) ABSTRACT

Disclosed herein is a technique for implementing a framework that enables application developers to enhance their applications with dynamic adjustment capabilities. Specifically, the framework, when utilized by an application on a mobile computing device that implements the framework, can enable the application to establish predictive models that can be used to identify meaningful behavioral patterns of an individual who uses the application. In turn, the predictive models can be used to preempt the individual's actions and provide an enhanced overall user experience. The framework is configured to interface with other software entities on the mobile computing device that conduct various analyses to identify appropriate times for the application to manage and update its predictive models. Such appropriate times can include, for example, identified periods of time where the individual is not operating the mobile computing device, as well as recognized conditions where power consumption is not a concern.

20 Claims, 9 Drawing Sheets

Related U.S. Application Data (60) Provisional application No. 62/005,791, filed on May 30, 2014.

(51) Int. Cl.
*G06N 5/043* (2023.01)
*H04L 67/10* (2022.01)

(56) References Cited

U.S. PATENT DOCUMENTS

| | | |
|---|---|---|
| 8,626,791 B1 | 1/2014 | Lin |
| 9,491,187 B2 | 11/2016 | Sridhara |
| 2003/0078907 A1 | 4/2003 | Soemo et al. |
| 2004/0023646 A1 | 2/2004 | Inami |
| 2007/0220034 A1* | 9/2007 | Iyer ............... G06F 16/2465 707/999.102 |
| 2008/0091804 A1 | 4/2008 | Swanburg |
| 2008/0133434 A1 | 6/2008 | Asar |
| 2008/0222348 A1 | 9/2008 | Mosek |
| 2010/0274509 A1 | 10/2010 | Nakajima |
| 2011/0251990 A1* | 10/2011 | Yarvis ............... G06Q 30/02 706/46 |
| 2013/0191534 A1 | 7/2013 | Neuse et al. |
| 2014/0046880 A1 | 2/2014 | Breckenridge |
| 2014/0053261 A1 | 2/2014 | Gupta |
| 2014/0304700 A1 | 10/2014 | Kim |
| 2015/0347907 A1 | 12/2015 | Matthew et al. |
| 2015/0347908 A1 | 12/2015 | Matthew et al. |

OTHER PUBLICATIONS

Anonymous, "Automatic resource allocation based on an adaptive application profile environment to optimize computing resources," Jul. 15, 2011, IP.com, p. 1-3.

Fried, "Coming Soon: Phones That Learn to Rest When You Do, Feb. 29, 2012," Dow Jones & Company Inc. , http://allthingsd.com/20120229/coming-soon-phones-that-learn-to-rest-when- -you-do/, p. 1.

Kridel et al., "Automated self-service modeling: predictive analytics as a service." Information Systems and e-Business Management 11.1 (2013): 119-140.

PCT Appiication No. PCT/US2015/027475—International Search Report and Written Opinion dated Jul. 13, 2015.

* cited by examiner

METHODS AND SYSTEM FOR MANAGING PREDICTIVE MODELS

CROSS-REFERENCE TO RELATED APPLICATIONS

The present application is a continuation of U.S. application Ser. No. 14/500,985 filed Sep. 29, 2014, which claims the benefit of U.S. Provisional Application No. 62/005,791, entitled "METHODS AND SYSTEM FOR MANAGING PREDICTIVE MODELS" filed May 30, 2014, the contents of both of which are incorporated herein by reference in their entirety for all purposes.

FIELD

The described embodiments set forth a technique for establishing, deploying, and updating predictive models across different computing devices.

BACKGROUND

Recent years have shown a proliferation in the number of individuals who own and operate mobile computing devices (e.g., smartphones and tablets). Typically, an individual uses his or her mobile computing device to carry out different types of activities throughout the day, e.g., placing phone calls, sending and receiving electronic messages, accessing the internet, and the like. These activities are highly personalized and specific to the individual, and, as a result, a pattern of behavior typically exists within the scope of each application that the individual accesses on his or her mobile computing device. For example, within a messaging application on an individual's mobile computing device, there typically exists a pattern among the contacts with whom he or she regularly communicates. These patterns present an opportunity for application designers to preempt an individual's habits and to dynamically adjust to provide an enhanced overall user experience. Such dynamic adjustment can include, for example, updating the manner in which content is displayed, suggesting input for the individual, recalling the individual's preferences, and the like.

Typical approaches used to implement dynamic adjustment are piecemeal at best. More specifically, when application developers desire to enhance their applications with dynamic adjustment capabilities, they are imposed with the difficult task of building frameworks that can identify and respond to individuals' behavioral patterns. Consequently, these frameworks often deliver inaccurate and undesirable functionality, which can frustrate individuals and degrade their overall user experience. Moreover, these frameworks can be inefficient with respect to the rate at which behavioral patterns are identified and to which they are adjusted. Such inefficiency can degrade the battery performance and overall responsiveness of mobile computing devices, especially when application developers fail to design the frameworks to identify appropriate times to carry out management tasks.

SUMMARY

Representative embodiments disclosed herein set forth a framework that enables application developers to enhance their applications with dynamic adjustment capabilities. Specifically, the framework, when utilized by an application on a mobile computing device that implements the framework, can enable the application to establish predictive models that can be used to identify meaningful behavioral patterns of an individual who uses the application. In turn, the predictive models can be used to preempt the individual's actions and provide an enhanced overall user experience. The framework is configured to interface with other software entities on the mobile computing device that conduct various analyses to identify appropriate times for the application to manage and update its predictive models. Such appropriate times can include, for example, identified periods of time where the individual is not operating the mobile computing device (e.g., at night when the individual is sleeping), as well as recognized conditions where power consumption is not a concern (e.g., when the mobile computing device is plugged-in). Thus, the framework reduces the burden with which application developers are conventionally faced when attempting to produce applications that are capable of evolving to complement individuals' different behavioral patterns.

One embodiment sets forth a method for generating and deploying predictive models to computing devices. The method is carried out at a source computing device, and includes the steps of (1) receiving a request to generate a raw predictive model based on a set of training data, (2) generating the raw predictive model based on the set of training data, and (3) identifying one or more destination computing devices to which the raw predictive model is to be deployed. The steps further include (4) for each of the one or more destination computing devices, and using the raw predictive model: (i) generating a deployment predictive model that is specific to the destination computing device, and (ii) providing the deployment predictive model to the destination computing device.

Another embodiment sets forth a method for managing a predictive model on a mobile computing device. The method is carried out at the mobile computing device, and includes the steps of (1) identifying a condition to perform an update to the predictive model, (2) accessing an updated set of training data on which to base the update to the predictive model, where the updated set of training data supplements an original set of training data previously used to establish the predictive model, and (3) updating the predictive model based on the updated set of training data. The steps further include (4) subsequent to updating the predictive model: (i) implementing the predictive model for usage on the mobile computing device, and (ii) updating a configuration to reflect that the updated set of training data has been processed.

Yet another embodiment sets forth a method for managing a predictive model on a mobile computing device. The method is carried out at the mobile computing device, and includes the steps of (1): identifying that a threshold amount of additional training data has been added to a set of training data on which the predictive model is based, (2) determining, based on parameters associated with the predictive model, an appropriate time to update the predictive model, (3) at the appropriate time, updating the predictive model based on the additional training data, and (4) subsequent to updating the predictive model, implementing the predictive model for usage.

Other embodiments set forth a non-transitory computer readable storage medium configured to store instructions that, when executed by a processor included in a computing device, cause the computing device to carry out the steps of any of the foregoing methods. Further embodiments set forth a system that includes a processor and a memory, where the memory stores instructions that, when executed by the processor, cause the system to carry out the steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments disclosed herein set forth a framework that enables application developers to utilize predictive models to enhance their applications. According to one embodiment, the framework can be implemented as an application programming interface (API) that includes a set of commands for establishing, deploying, and updating predictive models across applications executing on mobile computing devices. Specifically, the framework can enable developers to manage predictive models using a variety of approaches that are tailored to the specific natures of different applications. The framework can also identify appropriate times for applications to manage and update their predictive models in accordance with new training data that is available for processing.

In some cases, establishing a reliable predictive model requires intensive processing to be performed on a large set of training data. Consider, for example, a predictive model that is directed toward identifying a gender of an individual based on his or her height and shoe size. To establish this predictive model, it may be necessary to process tens of thousands of training data samples in order to identify a trend among the training data samples. Notably, carrying out this processing can be expensive in terms of energy and time consumption, which makes particular hardware platforms—such as a smartphone or a tablet—impractical for establishing the predictive model. Accordingly, one embodiment set forth herein involves establishing a predictive model at a source computing device (e.g., a server computing device, a desktop computing device, a laptop computing device, etc.), and then distributing the predictive model to destination computing devices (e.g., smartphones, tablets, wearable computers, car interfaces, etc.) that are configured to utilize the predictive model. Specifically, the source computing device first establishes a raw predictive model based on a set of training data, and then identifies different types of destination computing devices (e.g., a smartphone and a tablet) that will utilize the predictive model. In turn, the source computing device can establish, for each type of destination computing device, a "deployment" predictive model that is specifically tailored to the configuration (i.e., software and hardware capabilities) of the destination computing device. This beneficially enables the predictive model to be utilized by each type of destination computing device in an optimized manner. The source computing device can alternatively—or additionally—establish a generic predictive model—such as the raw predictive model—that can be distributed to destination computing devices. In turn, each destination computing device can process the generic predictive model to establish a deployment predictive model that is specific to the configuration of the destination computing device.

The generation of a deployment predictive model that is specific to a destination computing device can be accomplished using a variety of approaches. One approach, for example, can involve generating the deployment predictive model for an optimized load time on the destination computing device. In this example, the raw predictive model is generated and stored in a platform-independent form (e.g., raw text, extensible markup language (XML), etc.). Notably, if this platform-independent form of the raw predictive model were utilized by a destination computing device with limited computing power, the destination computing device would likely incur a large delay when parsing the raw predictive model to establish a form of the model that can be utilized by the destination computing device. To cure this deficiency, the raw predictive model can be deployed as a binary version that is specifically tailored to the destination computing device so that the destination computing device is not required to carry out a parsing function each time the model is utilized.

Another approach can involve generating the deployment predictive model that is based on a machine architecture of the destination computing device. Notably, destination computing devices may vary in aspects such as 64-bit versus 32-bit central processing units (CPUs), ARM® architecture versus Intel® architecture, alignment of binary data structures (as caused by changes to compilers), and the like. Accordingly, the deployment predictive model can be generated such that it is suitable and optimized for deployment on the target architecture of the destination computing device. This can include, for example, utilizing tiling matrices for the appropriate size of a data cache on the CPU, changing the "resolution" of models, implementing larger filters, and the like.

Yet another approach can involve generating the deployment predictive model based on a software platform being utilized by the destination computing device. Specifically, destination computing devices may vary in aspects such as the type of local database that is available (e.g., SQLite® versus proprietary storage formats). Accordingly, the deployment predictive model can be generated such that it is suitable and optimized for compatibility with the different software platforms that are implemented on the destination computing device.

Accordingly, the foregoing distribution scheme provides an efficient approach for deploying predictive models that require infrequent updates to maintain their relevancy and accuracy. In some cases, however, it is desirable for predictive models to periodically be updated at a mobile computing device in order to maintain relevancy and accuracy. Consider, for example, a predictive model that is directed toward preempting messaging habits (e.g., group messaging preferences, auto-correction preferences, etc.) of an individual who operates the mobile computing device. According to this example, it is beneficial to periodically update the predictive model based on updated training data that is gathered over time as the individual transmits messages using the mobile computing device. Such periodic updates can enable the predictive model to provide useful information, e.g., social networking-based observations derived from observing group messaging preferences. Accordingly, one embodiment set forth herein involves periodically updating a predictive model at a mobile computing device. In some cases, the aforementioned framework can be configured to identify a particular time at which the predictive model should be updated. This particular time can include, for example, a known time where the mobile phone is dormant (e.g., night time) and where the mobile phone is being charged. When the particular time is identified, the mobile computing device processes an updated set of training data associated with the predictive model. Next, the mobile computing device implements the updated predictive model for usage on the mobile computing device, and updates a configuration to reflect that the updated set of training data has been processed.

Accordingly, the foregoing distribution scheme provides an efficient approach for periodically updating a predictive model at a mobile computing device. In some cases, however, it is desirable for predictive models to continuously (instead of periodically) be updated at a mobile computing device. Consider, for example, a predictive model that is directed toward preempting email habits (e.g., frequent addressees, VIP contacts, etc.) of an individual who operates the mobile computing device. In this example, if a large number of emails are downloaded from a server (e.g., when the mobile computing device is purchased), it can be beneficial for the predictive model to be immediately established and updated instead of holding off until a later time (as with the periodic approach set forth above). In this manner, the predictive model can immediately be used to provide relevant and useful preemptive features to the individual. Accordingly, one embodiment set forth herein involves continuously updating a predictive model at a mobile computing device. Specifically, when a threshold amount of additional training data has been gathered, the mobile computing device updates the predictive model based on the additional training data. The mobile computing device then implements the updated predictive model for usage on the mobile computing device, and updates a configuration to reflect that the additional training data has been processed. It is noted that the repetition of this process can be based on a variety of factors, e.g., after a period of time has lapsed, after a threshold amount of new training data has been gathered, and the like.

Additional embodiments set forth herein are directed toward increasing efficiency and performance when managing predictive models on mobile computing devices. Specifically, one embodiment involves enhancing the manner in which predictive models are cached on mobile computing devices. Predictive models can be complex in nature and require a considerable number of rows and fields when being mapped from a file (when stored) to a database (when being processed), and vice-versa. Thus, it is beneficial to eliminate the necessity to re-perform the mapping each time the predictive model is updated. Accordingly, one embodiment set forth herein involves caching a predictive model into a memory of the mobile computing device, where the predictive model is stored as a contiguous file within the memory. When a threshold amount of training data associated with the predictive model is gathered, the predictive model is retrieved from the memory. Given the contiguous structure of the predictive model, the process by which the predictive model is updated is simplified, and the amount of work that is typically required to map the predictive model into a database is significantly reduced. The predictive model is then updated, and cached back into the memory using the same contiguous file approach.

Accordingly, the foregoing approaches provide techniques for establishing, deploying, and updating predictive models across different computing devices. A more detailed discussion of these techniques is set forth below and described in conjunction with FIGS. 1A, 1B, 1C, and 2-7, which illustrate detailed diagrams of systems and methods that can be used to implement these techniques.

Figure 1A:
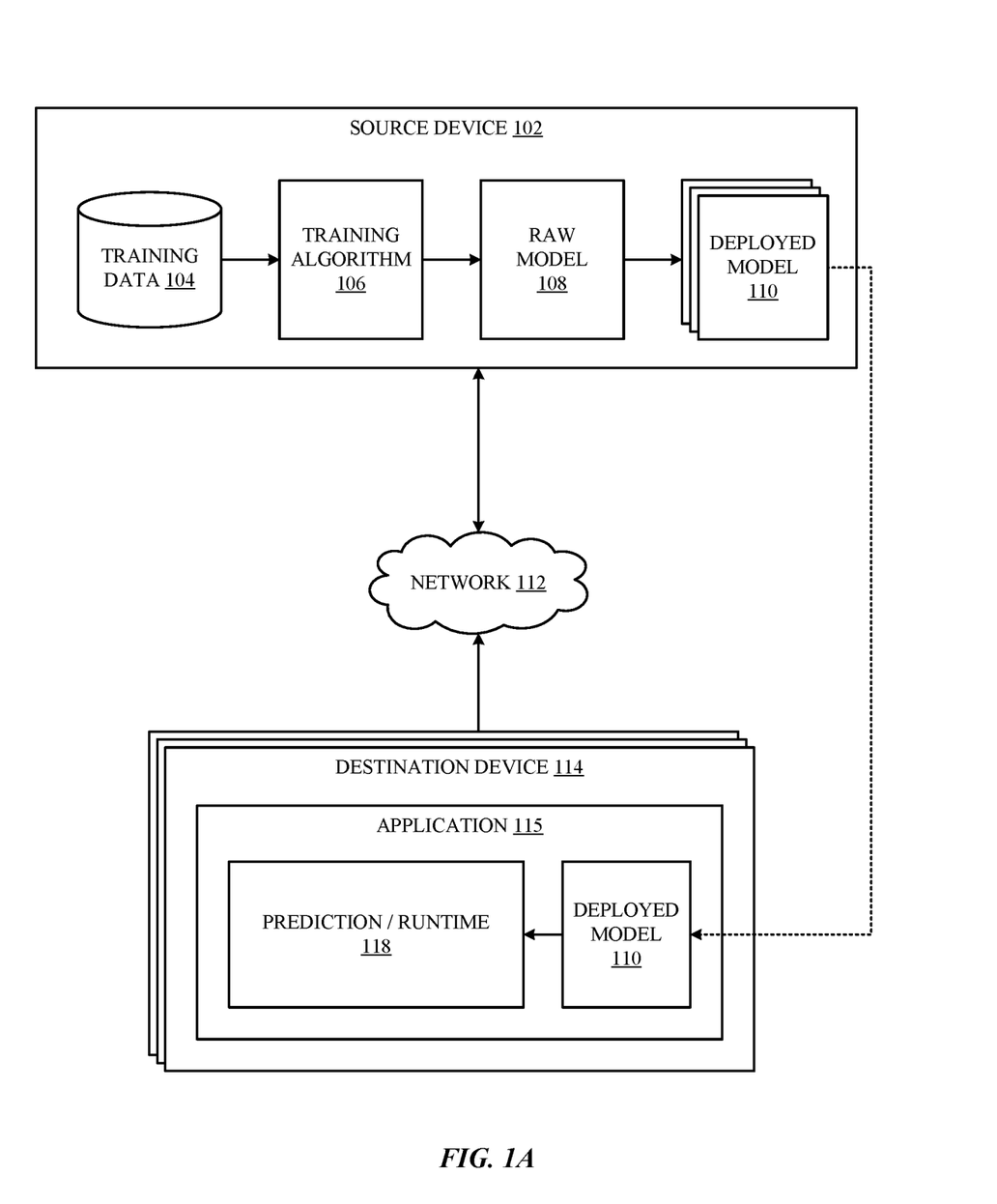
FIGS. 1A, 1B, and 1C illustrate block diagrams of systems configured to implement the various techniques described herein, according to some embodiments.

FIG. 1A illustrates a block diagram of different components of a system 100 that is configured to (1) establish a predictive model at a source device (e.g., a server), and then (2) distribute the predictive model to destination devices (e.g., smartphones) that are configured to utilize the predictive model, according to one embodiment. As shown in FIG. 1A, a source device 102—which can represent a server computing device, a desktop computing device, a laptop computing device, etc.—accesses training data 104, and processes the training data 104 using a training algorithm 106 to produce a raw predictive model 108. In turn, the source device 102 identifies the different types of destination devices 114 (e.g., smartphones tablets, wearable computers, car interfaces, etc.) to which the predictive model will be deployed. Specifically, a type of a destination device 114 can be defined by a hardware platform and/or a software platform utilized by the destination device 114, the performance capabilities of the destination device 114, and the like. These factors can be used to help determine optimized structures for the predictive models when implemented on the destination devices 114.

When the source device 102 identifies the destination devices 114, the source device 102 establishes deployed predictive models 110 that are transmitted to the destination devices 114 (over a network 112) and implemented on the destination devices 114. Alternatively, the source device 102 can distribute the raw predictive model 108 to the destination devices 114, whereupon each of the destination devices 114 can process the raw predictive model 108 to establish a deployed predictive model 110 that is optimized for the destination device 114. As shown in FIG. 1A, and within the context of a destination device 114, a deployed predictive model 110 can be associated with one or more applications 115 that execute on the destination device 114. In turn, the application 115 can establish prediction/runtime information 118 that enables the application 115 to carry out preemptive features aimed to enhance an individual's overall user experience when operating the destination device 114. Accordingly, the distribution scheme set forth in FIG. 1A provides an efficient approach for deploying predictive models that require infrequent updates to maintain their relevancy and accuracy.

Figure 1B:
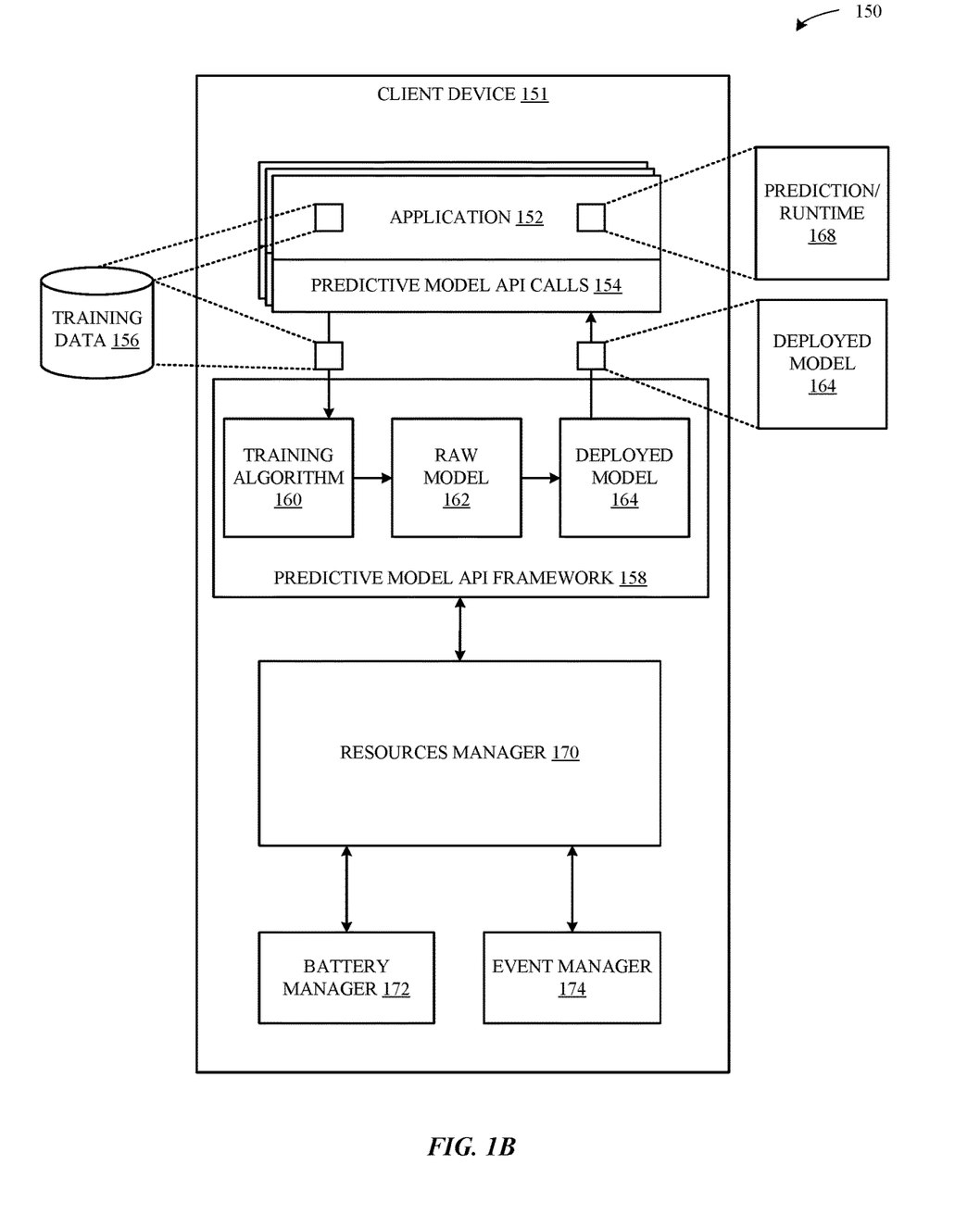

FIG. 1B illustrates a block diagram of different components of a system 150 that is configured to establish and periodically update a predictive model at a client device, according to one embodiment. As shown in FIG. 1B, a client device 151 can include applications 152 that are configured to utilize predictive model API calls 154 to access a predictive model API framework 158 that is available on the client device 151. Specifically, the predictive model API calls 154 can enable the applications 152 to perform a variety of operations associated with establishing and/or managing predictive models at the client device 151. For example, as shown in FIG. 1B, an application 152 provides training data 156 to a training algorithm 160 included in the predictive model API framework 158. In turn, the training algorithm 160 produces a raw model 162, which is then converted to a deployed predictive model 164. Again, the deployed predictive model 164 can be optimized for the client device 151 based on the capabilities of the client device 151. Once the deployed predictive model 164 is established, the deployed predictive model 164 is provided to the application 152 for implementation. In turn, the application 152 can establish prediction/runtime information 168 that enables the application 152 to carry out preemptive features aimed to enhance an individual's overall user experience when operating the client device 151.

As noted above, it can be desirable to periodically update the deployed predictive model 164 when additional training data 156 is gathered by the application 152. Such additional training data 156 can be gathered, for example, over time as the application 152 is utilized by an individual. To identify appropriate times at which to update the deployed predictive model 164, the predictive model API framework 158 interfaces with a resource manager 170 that is available to the client device 151. Specifically, the resource manager 170 is configured to monitor various aspects of the client device 151 to identify the appropriate times. The resource manager 170 can monitor these aspects by utilizing other software entities available to the client device 151, including a battery manager 172 and an event manager 174. The battery manager 172 can indicate power-related metrics to the resource manager 170, including a current charge level of a battery included in the client device 151, an average rate at which the charge level of the battery declines, whether or not the client device 151 is plugged-in to a power outlet and is charging, and the like. The event manager 174 can track the manner in which activities take place within the client device 151 in order to identify periods of time where the individual is not utilizing the client device 151 (e.g., late at night). Accordingly, the predictive model API framework 158 can remain in communication with the resource manager 170 to identify times at which predictive models should be updated. In turn, the predictive model API framework 158 can interface with the applications 152, gather updated training data 156 to perform updates to predictive models, and deploy updated predictive models to the applications 152.

Figure 1C:
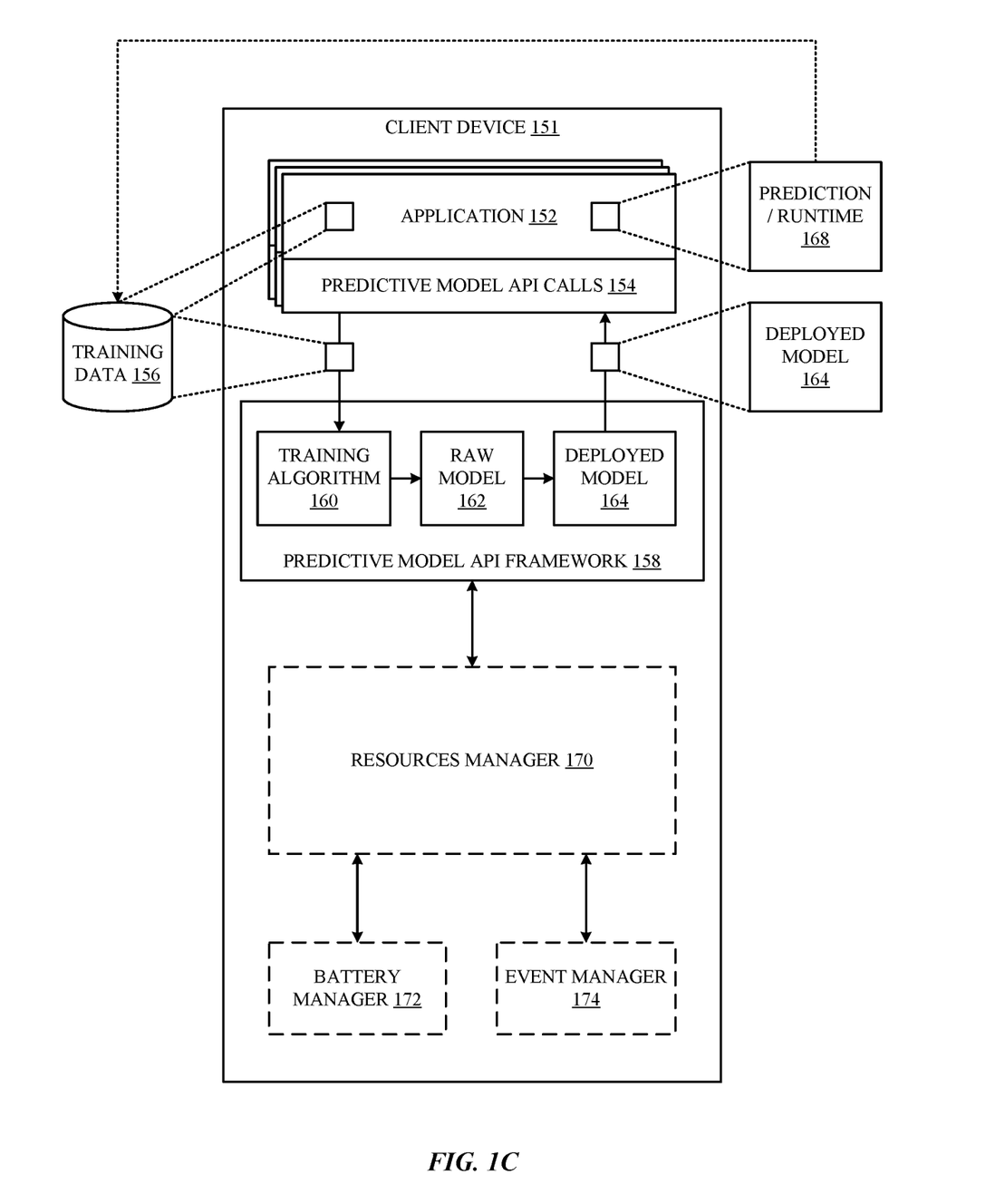

FIG. 1C illustrates a block diagram of different components of a system 180 that is configured to continuously update a predictive model at a client device 151, according to one embodiment. As shown in FIG. 1C, and described above in conjunction with FIG. 1B, the client device 151 can include applications 152 that are configured to utilize predictive model API calls 154 to access a predictive model API framework 158 that is available on the client device 151. As noted above, it can be desirable to continuously update a deployed predictive model 164 as additional training data 156 is gathered by the application 152 in conjunction with previously-established prediction/runtime information 168. Such additional training data 156 can be gathered, for example, over time as the application 152 is utilized by an individual. Although, in this example, the predictive model API framework 158 is configured to continuously update the deployed predictive model 164, the predictive model API framework 158 can optionally interface with the resource manager 170 to identify appropriate times at which to perform the updates to the predictive models. For example, the predictive model API framework 158 can interface with the resource manager 170 to ensure that updating the deployed predictive model 164 will not interfere with critical functions of the client device 151 when being operated by an individual (e.g., when in a phone call or when watching a video). In either case, the predictive model API framework 158 can continuously interface with the applications 152, gather updated training data 156 to perform updates to predictive models, and deploy updated predictive models to the applications 152.

Figure 2:
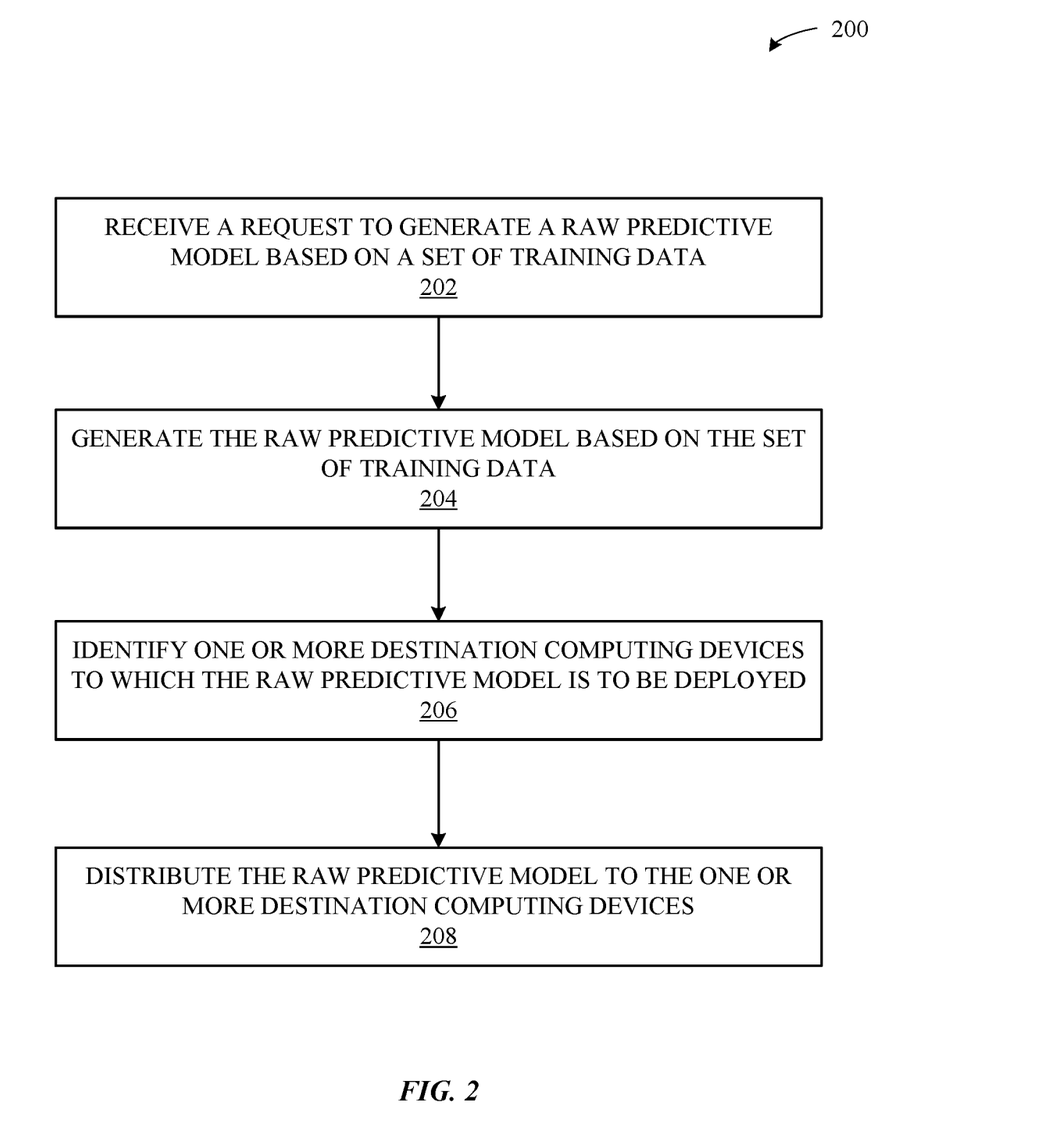
FIG. 2 illustrates a method for generating and deploying predictive models to computing devices, according to one embodiment.
Figure 3:
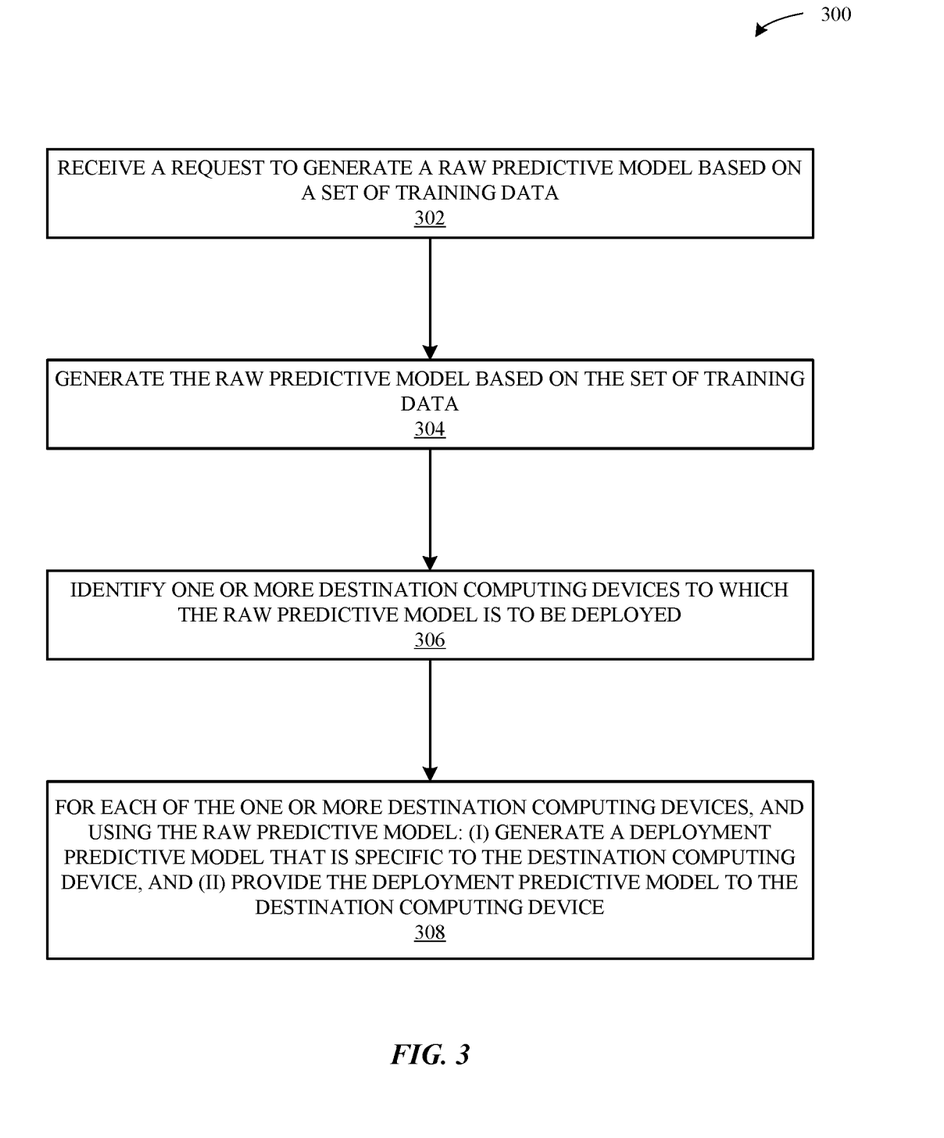
FIG. 3 illustrates another method for generating and deploying predictive models to computing devices, according to one embodiment.

Accordingly, FIGS. 1A, 1B, and 1C illustrate different approaches for establishing, deploying, and updating predictive models across different computing devices. FIGS. 2-3 are provided to supplement the embodiment set forth in FIG. 1A. In particular, FIG. 2 illustrates a method 200 for generating and deploying predictive models to computing devices, according to one embodiment. Specifically, FIG. 2 coincides with the embodiment of FIG. 1A set forth above that involves establishing a raw predictive model at a source computing device and distributing the raw predictive model to destination computing devices, whereupon the destination computing devices convert the raw predictive models into deployment predictive models based on their configurations. As shown in FIG. 2, the method 200 begins at step 202, where the source device 102 receives a request to generate a raw predictive model based on a set of training data. At step 204, the source device 102 generates the raw predictive model based on the set of training data. At step 206, the source device 102 identifies one or more destination computing devices to which the raw predictive model is to be deployed. At step 208, the source device 102 distributes the raw predictive model to the one or more destination computing devices.

FIG. 3 illustrates a method 300 for generating and deploying predictive models to computing devices, according to one embodiment. Specifically, FIG. 3 coincides with the embodiment of FIG. 1A set forth above that involves, at a source device, converting a raw predictive model into deployment predictive models, and distributing the deployment predictive models to destination computing devices. As shown, the method 300 begins at step 302, where the source device 102 receives a request to generate a raw predictive model based on a set of training data. At step 304, the source device 102 generates the raw predictive model based on the set of training data. At step 306, the source device 102 identifies one or more destination computing devices to which the raw predictive model is to be deployed. At step 308, the source device 102, for each of the one or more destination computing devices, and using the raw predictive model: (i) generates a deployment predictive model that is specific to the destination computing device, and (ii) provides the deployment predictive model to the destination computing device.

Figure 4:
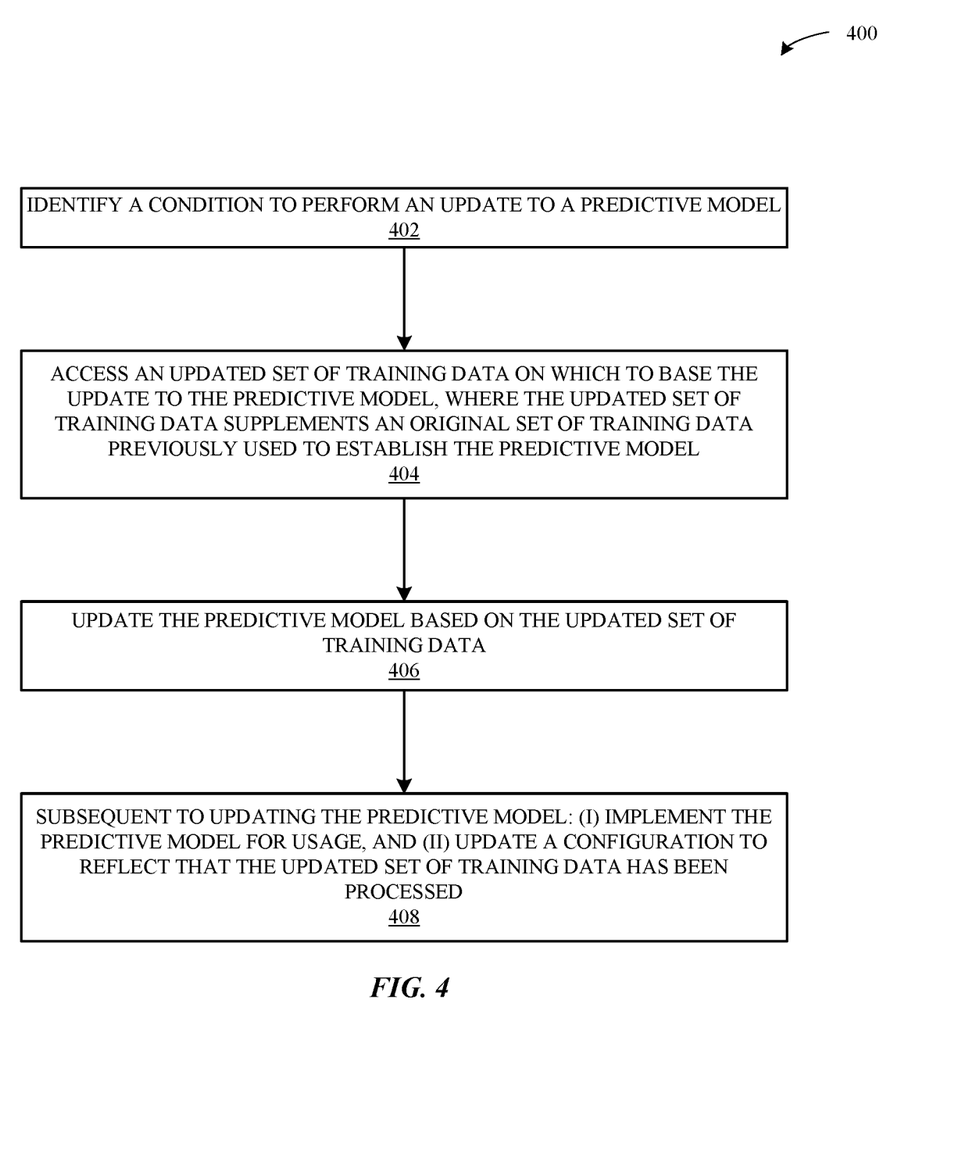
FIG. 4 illustrates a method for periodically updating a predictive model at a mobile computing device, according to one embodiment.

Additionally, FIG. 4 is provided to supplement the embodiment set forth in FIG. 1B. In particular, FIG. 4 illustrates a method 400 for periodically updating a predictive model at a mobile computing device, according to one embodiment. As shown, the method 400 begins at step 402, where the predictive model API framework 158 identifies a condition to perform an update to a predictive model. At step 404, the predictive model API framework 158 accesses an updated set of training data on which to base the update to the predictive model, where the updated set of training data supplements an original set of training data previously used to establish the predictive model. At step 406, the predictive model API framework 158 updates the predictive model based on the updated set of training data. At step 408, the predictive model API framework 158, subsequent, to updating the predictive model: (i) implements the predictive model for usage, and (ii) updates a configuration to reflect that the updated set of training data has been processed.

Figure 5:
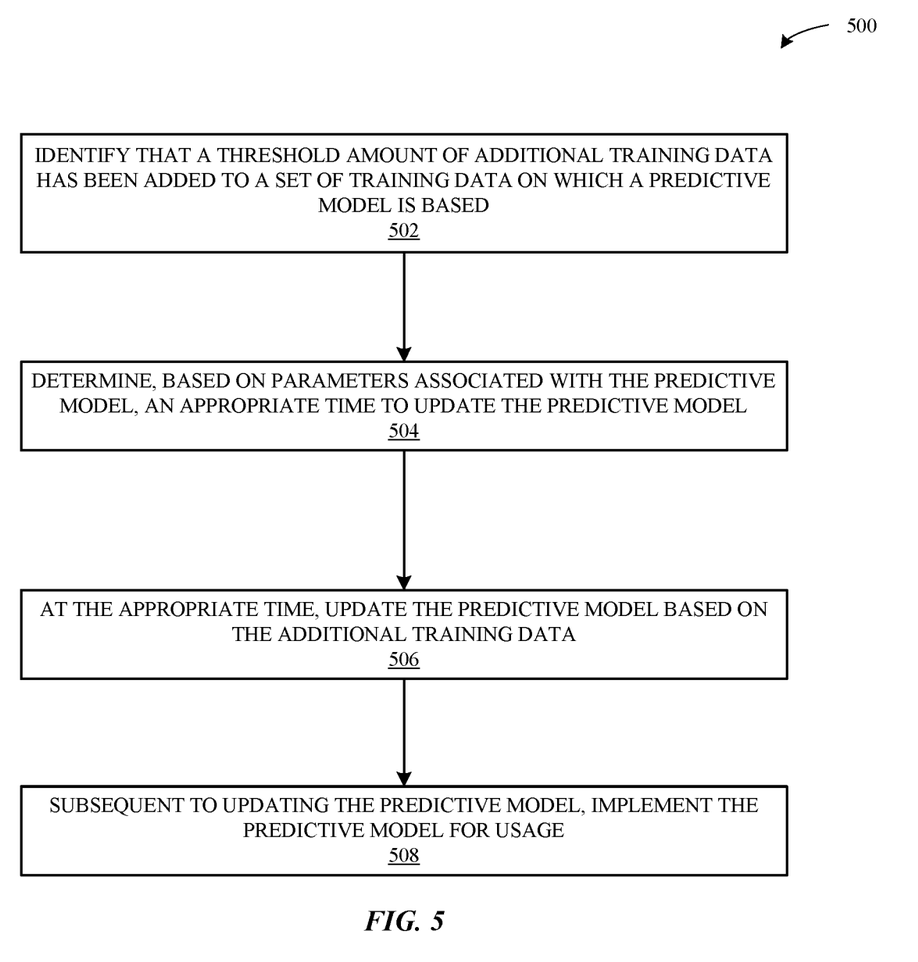
FIG. 5 illustrates a method for continuously updating a predictive model at a mobile computing device, according to one embodiment.

Additionally, FIG. 5 is provided to supplement the embodiment set forth in FIG. 1C. In particular, FIG. 5 illustrates a method 500 for continuously updating a predictive model at a mobile computing device, according to one embodiment. As shown, the method 500 begins at step 502, where the predictive model API framework 158 identifies that a threshold amount of additional training data has been added to a set of training data on which a predictive model is based. At step 504, the predictive model API framework 158 determines, based on parameters associated with the predictive model, an appropriate time to update the predictive model. At step 506, the predictive model API framework 158, at the appropriate time, updates the predictive model based on the additional training data. At step 508, the predictive model API framework 158, subsequent to updating the predictive model, implements the predictive model for usage.

Figure 6:
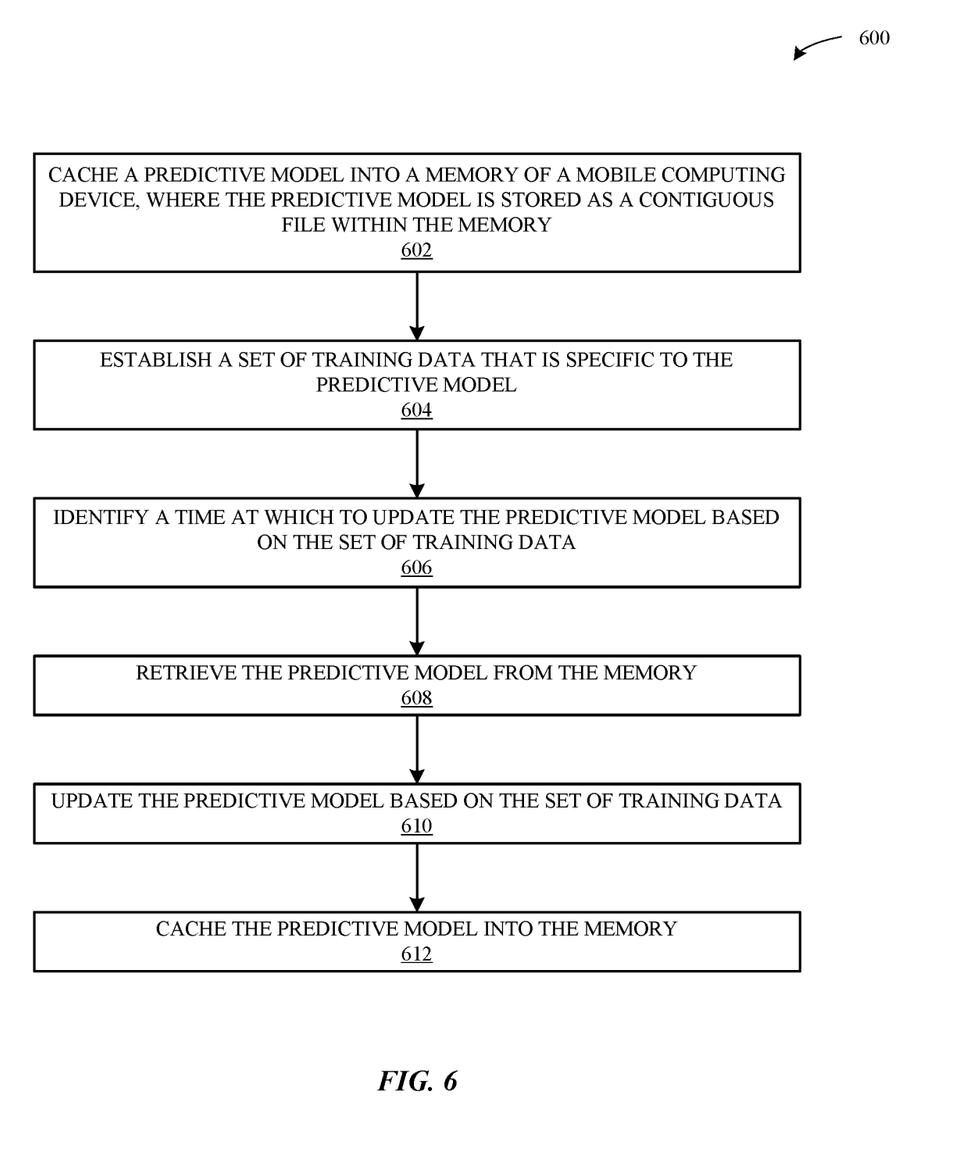
FIG. 6 illustrates a method for caching a predictive model at a mobile computing device, according to one embodiment.

As previously noted herein, additional approaches can be implemented to optimize then manner in which the predictive models are stored on the different computing devices. For example, a mobile computing device can be configured to store a predictive model in a contiguous file so that it is not necessary to reconstruct and deconstruct the predictive model each time the predictive model is read from and stored into memory. Accordingly, FIG. 6 illustrates a method 600 for caching a predictive model into a memory of the mobile computing device, where the predictive model is stored as a contiguous file within the memory, according to one embodiment. As shown, the method 600 begins at step 602, where the predictive model API framework 158 caches a predictive model into a memory of a mobile computing device, where the predictive model is stored as a contiguous file within the memory. At step 604, the predictive model API framework 158 establishes a set of training data that is specific to the predictive model. At step 606, the predictive model API framework 158 identifies a time at which to update the predictive model based on the set of training data. At step 608, the predictive model API framework 158 retrieves the predictive model from the memory. At step 610, the predictive model API framework 158 updates the predictive model based on the set of training data. At step 612, the predictive model API framework 158 caches the predictive model into the memory.

Figure 7:
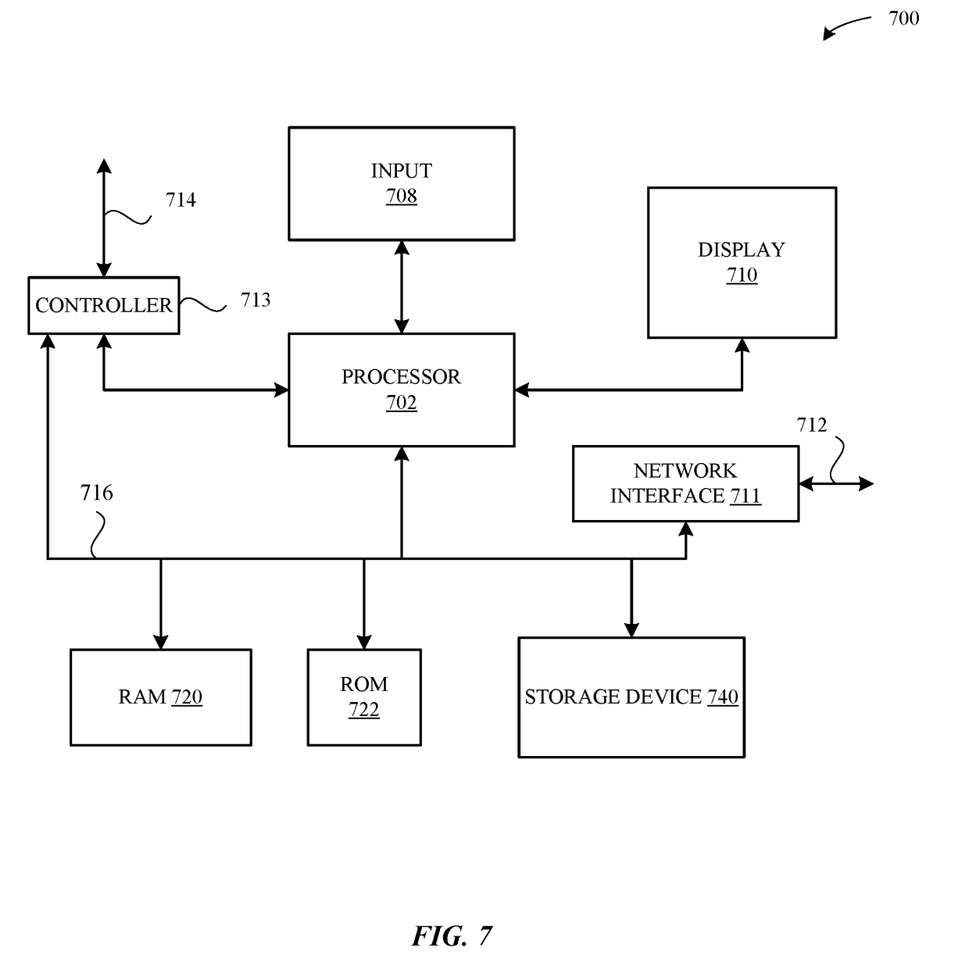
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the various computing devices illustrated in FIGS. 1A, 1B, and 1C. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing devices.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
receiving, by a mobile computing device, a first predictive model from a source computing device, the first predictive model having been generated by the source computing device based on an original set of training data;
generating a second predictive model based on the first predictive model;
updating the second predictive model based on an updated set of training data that supplements the original set of training data used by the source computing device to generate the second predictive model; and
implementing the second predictive model for use on the mobile computing device.

2. The method of claim 1, wherein updating the second predictive model comprises:
updating the second predictive model responsive to receipt of a notification from a power management module of the source computing device.

3. The method of claim 1, further comprising:
providing, after updating the second predictive model, the second predictive model to an application that utilizes the second predictive model, the application executing on the mobile computing device.

4. The method of claim 1, further comprising:
updating the second predictive model responsive to identifying that a threshold amount of additional training data has been added to the original set of training data.

5. The method of claim 1, further comprising:
updating a configuration to reflect that the updated set of training data has been processed.

6. A device comprising:
a memory; and
at least one processor configured to:
receive a first predictive model from a source computing device, the first predictive model having been generated by the source computing device based on an original set of training data;
generate a second predictive model based on the first predictive model;
update the second predictive model based on an updated set of training data that supplements the original set of training data used by the source computing device to generate the second predictive model; and
implement the second predictive model for use on the device.

7. The device of claim 6, wherein the device further comprises a power management module and the at least one processor is further configured to:
update the second predictive model responsive to receipt of a notification from the power management module.

8. The device of claim 7, wherein the power management module is configured to provide the notification when the device is connected to an external power source or when the device is not being operated by a user.

9. The device of claim 6, wherein the memory is configured to store the original set of training data and the updated set of training data.

10. The device of claim 6, wherein the at least one processor is further configured to provide, after the update, the second predictive model to an application that utilizes the second predictive model and executes on the at least one processor.

11. The device of claim 6, wherein the at least one processor is further configured to:
update the second predictive model responsive to identifying that a threshold amount of additional training data has been added to the original set of training data.

12. The device of claim 6, wherein the at least one processor is further configured to determine to update the second predictive model based on parameters associated with the second predictive model.

13. The device of claim 12, wherein the parameters indicate one or more of: a historical average amount of time required to update to the second predictive model, a historical average amount of processing resources that are required to update the second predictive model, and a historical average amount of memory resources that are required to update the second predictive model.

14. The device of claim 6, wherein the at least one processor is configured to update at least one other predictive model while the second predictive model is being updated.

15. The device of claim 6, wherein the at least one processor is configured to:
receive, via an over the air update, a replacement predictive model that is associated with the second predictive model; and
replace the second predictive model with the replacement predictive model.

16. The device of claim 6, wherein the at least one processor is configured to:
update a configuration to reflect that the updated set of training data has been processed.

17. A non-transitory machine readable medium configured to store code that, when executed by at least one processor of a mobile computing device, cause the at least one processor to perform operations, the code comprising:
code to receive a first predictive model from a computing device, wherein the first predictive model is generated by the computing device and is based on an original set of training data, and the computing device is separate from the mobile computing device;
code to generate a second predictive model based on the first predictive model; and
code to implement the second predictive model for use on the mobile computing device.

18. The non-transitory machine readable medium of claim 17, wherein the code further comprises:
code to determine that an update condition is satisfied with respect to the second predictive model; and
code to, responsive to the determination, update the second predictive model based on an updated set of training data that supplements the original set of training data.

19. The non-transitory machine readable medium of claim 18, wherein the update condition is satisfied when the mobile computing device is connected to an external power source or when the mobile computing device is not being operated by a user.

20. The non-transitory machine readable medium of claim 18, wherein the code further comprises:
code to update a configuration to reflect that the updated set of training data has been processed.

* * * * *

UNITED STATES PATENT AND TRADEMARK OFFICE
CERTIFICATE OF CORRECTION

| | |
|---|---|
| PATENT NO. | : 11,847,576 B2 |
| APPLICATION NO. | : 16/538706 |
| DATED | : December 19, 2023 |
| INVENTOR(S) | : Binu K. Mathew et al. |

It is certified that error appears in the above-identified patent and that said Letters Patent is hereby corrected as shown below:

On the Title Page

IN OTHER PUBLICATIONS:

On Page 2 Column 2 Line 11: "PCT Appiication No. PCT/US2015/027475" should read: --PCT Application No. PCT/US2015/027475--.

Signed and Sealed this
Nineteenth Day of March, 2024

Katherine Kelly Vidal
*Director of the United States Patent and Trademark Office*